(12) United States Patent
Briesemeister

(10) Patent No.: US 6,721,537 B1
(45) Date of Patent: Apr. 13, 2004

(54) METHOD FOR DISSEMINATING A MESSAGE

(75) Inventor: Linda Briesemeister, Berlin (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/807,622

(22) PCT Filed: Sep. 10, 1999

(86) PCT No.: PCT/EP99/06675
§ 371 (c)(1),
(2), (4) Date: Apr. 16, 2001

(87) PCT Pub. No.: WO00/23966
PCT Pub. Date: Apr. 27, 2000

(30) Foreign Application Priority Data

Oct. 16, 1998 (DE) .......................................... 198 49 294

(51) Int. Cl.⁷ ................................................. H04B 7/15
(52) U.S. Cl. ...................................... 455/11.1; 455/517
(58) Field of Search ............................. 392/963, 36.7, 392/357, 372, 359; 455/456.1, 562.1, 11.1, 7, 517; H04L 12/18

(56) References Cited

U.S. PATENT DOCUMENTS

| | | | |
|---|---|---|---|
| 4,403,208 A | | 9/1983 | Hodgson et al. .............. 340/33 |
| 5,311,197 A | * | 5/1994 | Sorden et al. ............... 342/457 |
| 6,512,481 B1 | * | 1/2003 | Velazquez et al. .......... 342/367 |
| 2003/0001779 A1 | * | 1/2003 | Mintz et al. ................. 342/463 |

FOREIGN PATENT DOCUMENTS

EP    0 461 279 A    12/1991

OTHER PUBLICATIONS

Rokitanksy C H: "Performance Analysis of Adaptive Multi–Hop Routing Protocols Using a Markov Model", Proceedings of the Vehicular Technology Society Conference, (VTSC), U.S. New York, IEEE, Bd. Conf. 42, May 1992 pp. 1084–1092.

* cited by examiner

*Primary Examiner*—Nguyen T. Vo
*Assistant Examiner*—Randy Peaches
(74) *Attorney, Agent, or Firm*—Venable; Robert Kinberg; Norman Kunitz

(57) ABSTRACT

In the present method for broadcasting a message in an incomplete radio communication network (2) having a fluctuating number of subscribers (4–12) for forwarding the message, with each subscriber having a transmitting and receiving device for messages and a positioning system for determining his global position, subscribers (6–12) determine their own position, and the distance d from the sender of the message, who is also a subscriber (6–12), after receiving the message, and transmit the message, with their own position, to further subscribers (6–12) after a predetermined waiting period t, which decreases monotonically as the distance d increases. This measure ensures a rapid transmission of the message that does not burden the radio communication network (2).

9 Claims, 2 Drawing Sheets

METHOD FOR DISSEMINATING A MESSAGE

Figure 1:
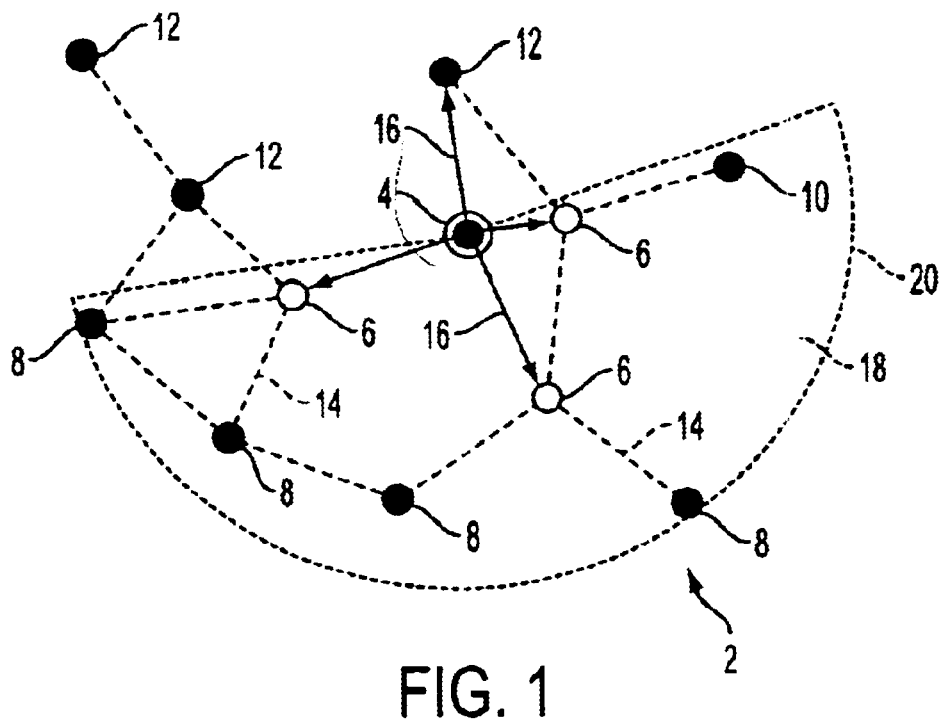

The invention relates to a method for broadcasting a message in an incomplete partial network of a radio communication network.

Methods for broadcasting messages are used, for example, in the field of mobile, wireless communication, particularly in ad hoc networks. In these networks, the subscribers converge spontaneously and briefly. The arrangement of the mobile subscribers of the network is arbitrary, and can change with respect to space and time. An ad hoc network is normally a mobile, incomplete radio communication network with a decentralized control.

A radio network is only considered complete if a direct radio connection exists between each subscriber pair. Each subscriber is equipped with a radio device, so he can communicate with other subscribers within range. There is no central entity that controls or checks the radio network structured in this manner. Furthermore, the subscribers have local clocks that are equipped with a synchronized time resolution.

Ad hoc networks occur, for example, when mobile computers (laptops, palmtops, etc.) converge at a conference. A plurality of robots communicating with one another and moving in terrain that is difficult to access, such as in deep space, under water or on a battlefield, etc., can also constitute an ad hoc network.

Moreover, there are already miniature devices that are equipped with communication capabilities and are worn on a person. An example is a device named "Lovegety" by the Erfolg Co. of Japan, which is described in, among other things, the "Personals" section of the Tagesspiegel [Daily Mirror] of Jun. 3, 1998, and is intended to help people find a suitable partner. In the future, such devices will be able to form ad hoc networks for performing more complex tasks.

Finally, this application encompasses radio-based, direct vehicle-to-vehicle communication.

In the methods known from the state of the technology for broadcasting messages, the identified communication partners must know the addresses to which the messages are to be sent. If this prerequisite is not met, the known methods cannot be employed, because the necessary information is exceedingly difficult to obtain. Moreover, a direct radio connection between each subscriber pair is often required.

To employ the methods known from the state of the technology, the entire network topology must be known, or be ascertainable by central entities.

The topology of a network usually refers to the distribution of the subscribers or network nodes, and their connection with one another.

It is the object of the invention to provide a method for broadcasting a message in an incomplete radio communication network with a fluctuating number of participants for forwarding the message, in which the message is transmitted as quickly as possible and the subscribers do not necessarily have radio contact with one another at all times.

The object is accomplished by a method for broadcasting a message in an incomplete radio communication network having a fluctuating number of subscribers for forwarding the message, in which each subscriber has a transmitting and receiving device for messages and a positioning system for determining his global position. In accordance with the invention, after receiving the message, subscribers determine their own position and the distance d from the sender of the message, who is likewise a subscriber, and forward the message, with their position, to further subscribers after a predetermined waiting period t, which decreases monotonically as the distance 2 increases.

The method assures an optimum broadcasting of messages, particularly of short messages, data packets and status reports, in a radio communication network when the subscribers have no information about the network topology. The message is transmitted rapidly, from a subscriber acting as the sender of the message to be transmitted, to at least one further subscriber of the partial network; not all subscribers must be within range of the sender of the message.

Unlike approaches known from the state of the technology, the method takes into account the limited knowledge of individual subscribers in the mobile, decentralized radio communication network. The subscribers need not be aware of the complete topology of the network. The method optimizes the message broadcasting with the presupposition of little knowledge about network subscribers and the actual network.

The presupposition that it is not necessary for each subscriber to be familiar with the network topology is practical and reasonable, because the topology can change continuously due to the considerable mobility of some of the subscribers.

A typical example from traffic technology serves to explain this: A two-vehicle accident has occurred on a road. The message about the accident is transmitted to the surroundings by at least one of the involved motor vehicles, as the initiator. The target region for the message includes, for example, a target space having a semicircular outline and a radius of about 10 kilometers. All motor vehicles located within this target space make up the target group for the message about the accident. The position and number of the receivers normally change over time. Therefore, precise knowledge of the network topology inside the target space at a certain time does not assure a necessary quantity of information.

The message transmitted by the first subscriber preferably includes a geometrical description of the target region for his message.

The determination of the boundary of the target region can clarify in advance to which group of receivers the message should be transmitted so that it is put to good use.

In particular, the subscribers can use a decision function to determine their association with the target region, and only forward the message if they are associated with it. In addition to the geometrical boundary of the target region, other decision criteria can be relevant for the decision of whether or not the subscribers are associated with the provided target region.

In a further embodiment of the invention, the subscribers only forward the received message to further subscribers after the first reception of the message. After receiving the message, each subscriber determines whether he is receiving the message for the first time. For this purpose, the subscriber checks a list that includes a message key relating to a unique association of previously-received messages with the respective sender. If the subscriber has already received the message, he engages in no further activities, because he has already forwarded the message to further subscribers. This avoids unnecessary occupation of the radio communication network.

The waiting period t between reception and transmission preferably decreases exponentially as the distance d between the communicating subscribers increases. This structuring of the predetermined waiting period t has proven particularly advantageous in trials.

The dependent claims disclose further advantageous embodiments.

Figure 2:
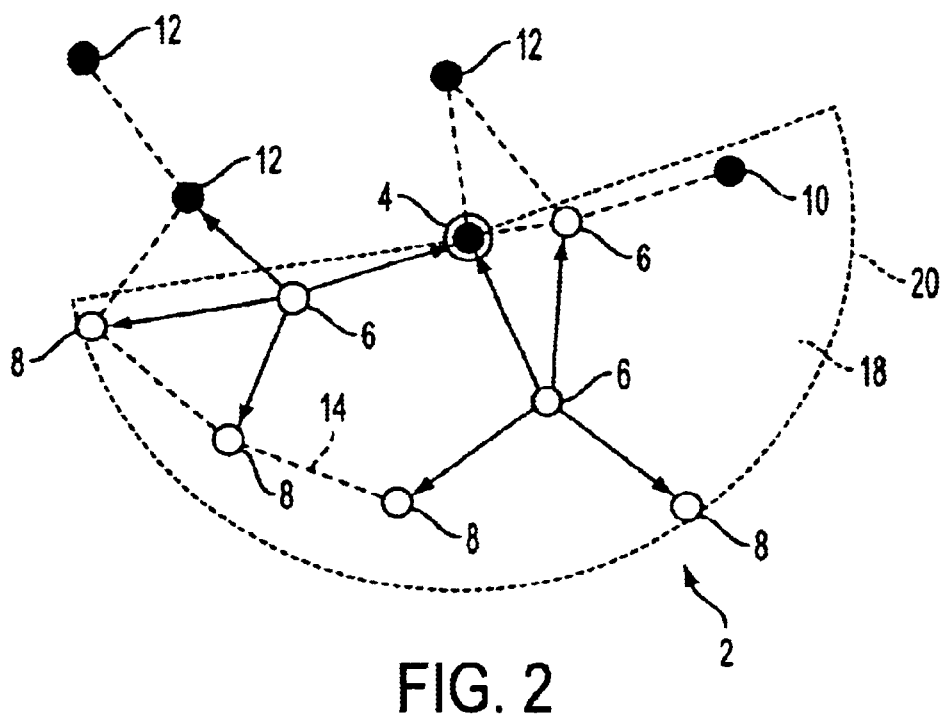
Figure 3:
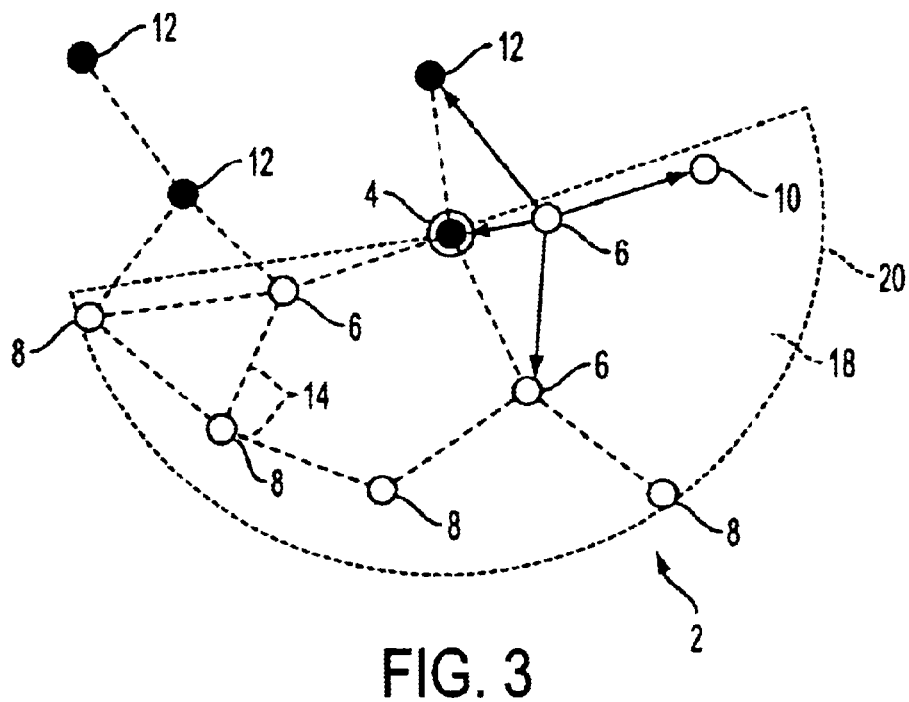
Figure 4:
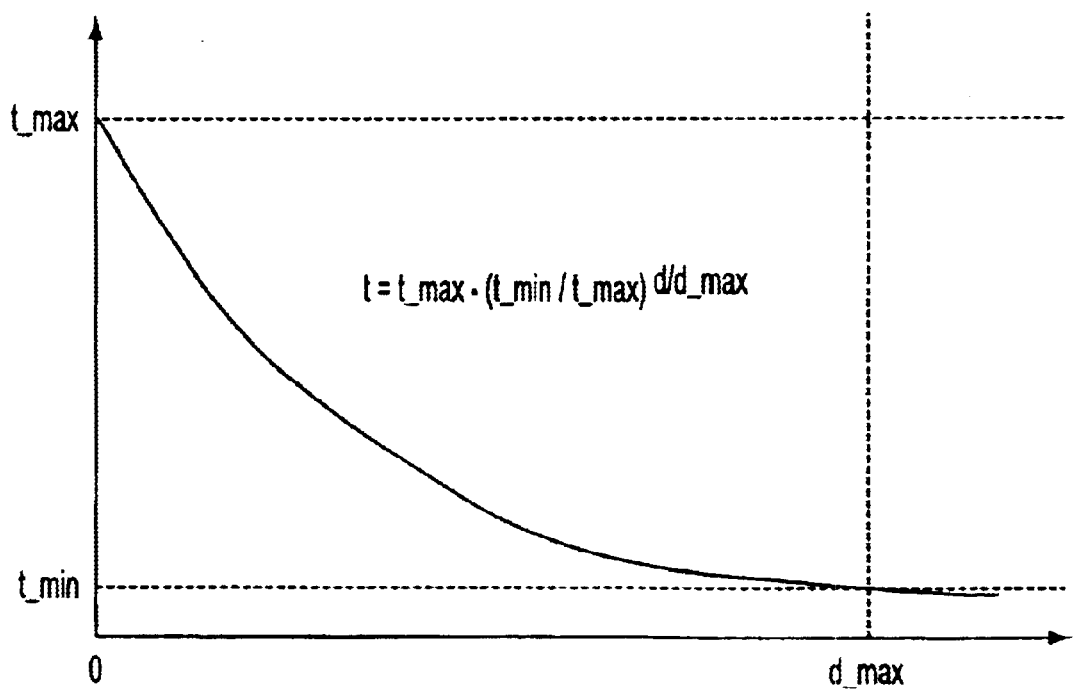

The invention is described in detail below by way of exemplary embodiments illustrated in the drawing figures. Shown are in:

FIGS. 1–3 scenarios for broadcasting messages, in a schematic representation; and FIG. 4 the waiting period t as a function of the distance d between two subscribers.

FIGS. 1 through 3 schematically illustrate an incomplete radio communication network 2. A network is defined as incomplete if no direct radio connection exists between each subscriber of the network. The radio communication network 2 usually has a fluctuating number of subscribers 4 through 12. Dashed-line paths 14 and arrows 16 describe possible direct radio connections between two respective subscribers 4 through 12.

Each subscriber 4 through 12 has a transmitting and receiving device for messages, and a positioning system for determining his global position.

FIG. 1 describes the scenario of the radio communication network 2 at a time $t_1$. A subscriber 4 transmits a message into the surrounding space, thereby also transmitting his global position. An omnidirectional aerial, for example, can assist in radiating the message.

Subscribers 6 receive the message sent by the subscriber 4, with the information about his global position. Arrows 16 indicate the possible radio connections with the subscriber 4 at the time $t_1$. The message sent by the subscriber 4 contains a description of the target region for his message. The target region need not be limited for all applications, however.

In the present situation, the first subscriber 4 can reach four subscribers 6, 12 due to the technical marginal conditions. Only the subscribers 6 are located in the predetermined target region 18, which is limited by the dotted, closed line 20.

In a further exemplary embodiment, not shown, no target region is provided. In other words, the neighboring subscriber 12 can also receive a message from the subscriber 4.

For the sake of a clear overview, circles that are not filled in represent the subscribers 6 shown in FIG. 1.

The constellation shown here could appear in roadway traffic, for example. The subscriber 4 would be, for example, a motor vehicle that is stranded due to engine trouble, and is interfering with traffic approaching from behind. The stranded subscriber 4 could transmit a message to the subscribers 6, that is, motor vehicles approaching from behind in the same direction, in order to inform these vehicles of the engine trouble of the subscriber 4. This could prevent traffic jams.

Ideally, an appropriate message would have to be transmitted automatically, without driver involvement. Had the subscriber 4 experienced a traffic accident, for example, the driver may not even be capable of transmitting messages.

The subscribers 6 determine their own position, for example with a method based on the Global Positioning System (GPS), and their distance from the subscriber 4. At a time $t_2$, with $t_2 > t_1$, the message from the subscriber 4, with his global position, is forwarded from the subscribers 6 to further subscribers 8 (FIG. 2) after a predetermined waiting period t, which decreases as the distance d between the subscribers 4, 6 increases. In this embodiment, the subscriber 6 only forwards the message if he is receiving it for the first time. This avoids an unnecessary establishment of radio connections between the subscribers 4 through 12.

Because $t_2$ is a function of the predetermined waiting period t, and thus the distance between the subscribers, subscribers 6 in the vicinity of the subscriber 4 may not even have transmitted the message at the time $t_2$. The neighboring subscribers 6 first forward the message to further subscribers 8 at a time $t_3$, with $t_3 > t_2$ (FIG. 3).

Another option is for the subscribers 6 through 10, as receivers of the message from the first subscriber 4, to determine their association with the target region 20 with the aid of a decision function. A geometrical association with the target region 20 may not suffice in and of itself, so at least one further decision function is used in assessing the association with the target region.

The diagram in FIG. 4 depicts the exponential decrease in the waiting period t as a function of the distance d between two subscribers 4 through 10, particularly between the first subscriber 4 and second subscribers 6. This ensures that subscribers 6 through 10 are preferably provided at the edge of the target region for rapid forwarding of the message of the first subscriber 4; this ensures, among other things, a rapid, effective broadcasting of the message of the first subscriber 4. Depending on the scenario, however, other functional dependencies of the waiting period t on the distance d can also be used. In particular, different functional dependencies within the partial network can also be used.

The message is forwarded from the subscribers 6 through 10 to the subscribers 6 through 12 in the radio communication network until all of the subscribers 6 through 12 have received the message. In a further embodiment, the message is provided with a counter, which tallies the number of completed transmissions of the message; here, the message is forwarded until a predetermined value for the count of the counter has been attained.

The method according to the invention assures an optimum broadcasting of messages, particularly short messages, data packets and status reports, in the radio communication network 2.

What is claimed is:

1. A method for broadcasting a message in an incomplete radio communication network (2) having a fluctuating number of subscribers (4–12) for forwarding the message, with each subscriber having a transmitting and receiving device for messages, and a positioning system for determining his global position, characterized in that subscribers (6–12) determine their own position and the distance d from the sender of the message after receiving the message, and forward the message, with their position, to further subscribers (6–12) after a predetermined waiting period t, which decreases monotonically as the distance d increases.

2. The method according to claim 1, characterized in that subscribers (6–12) only forward the received message after receiving it for the first time.

3. The method according to claim 1, characterized in that the transmitted message contains a geometrical description of a target region (20) for the message.

4. The method according to claim 3, characterized in that subscribers (6–12) can use a local decision function to determine their association with the target region (20), and only forward the message if they are associated with the target region (20).

5. The method according to claim 1, characterized in that the message is provided with a counter, which tallies the number of completed transmissions of the message, with the message being forwarded until a predetermined value for the counter has been attained.

6. The method according to claim 1, characterized in that the waiting period t decreases exponentially as the distance d between the communicating subscribers (6–12) increases.

7. The method according to claim 1, characterized in that the message contains the global position of an event.

8. The method according to claim 1, characterized in that the global position is determined in accordance with a method based on the Global Positioning System (GPS).

9. The method according to claim 1, characterized in that an omnidirectional aerial transmits the message.

* * * * *